United States Patent [19]

Spaargaren et al.

[11] 4,243,125
[45] Jan. 6, 1981

[54] SELF-ADJUSTING DRUM BRAKE

[75] Inventors: Robert Spaargaren, Southfield; Albert DiMatteo, Metamora, both of Mich.

[73] Assignee: Chrysler Corporation, Highland Park, Mich.

[21] Appl. No.: 77,830

[22] Filed: Sep. 21, 1979

[51] Int. Cl.³ .............................................. F16D 65/40
[52] U.S. Cl. ......................... 188/79.5 P; 188/196 BA; 192/111 A
[58] Field of Search ................... 188/79.5 R, 79.5 GE, 188/79.5 K, 79.5 P, 79.5 SS, 79.5 S, 196 BA; 192/111 A

[56] References Cited

U.S. PATENT DOCUMENTS

| | | | |
|---|---|---|---|
| 2,209,772 | 7/1940 | Goepfrick et al. | 188/331 |
| 3,339,678 | 9/1967 | Burnett | 188/79.5 P |
| 3,460,653 | 8/1969 | Wieger | 188/196 BA X |
| 3,963,100 | 6/1976 | Kaub | 188/79.5 P |

FOREIGN PATENT DOCUMENTS 1402527  8/1975 United Kingdom ............ 188/79.5 GE
1406069  9/1975 United Kingdom ............ 188/79.5 GE

*Primary Examiner*—George E. A. Halvosa
*Attorney, Agent, or Firm*—Newtson & Dundas

[57] ABSTRACT

A leading trailing drum brake with an improved strut and adjusting pawl mechanism. The adjusting pawl comprises a single piece which is mounted in a shaped aperture within one of the brake shoes to provide a structure which can be easily assembled. The pawl has an arm which contacts the strut in an off-set position from the longitudinal axis of the strut and applies a force to the strut parallel to its longitudinal axis.

2 Claims, 2 Drawing Figures

SELF-ADJUSTING DRUM BRAKE

BACKGROUND OF THE INVENTION

1. Field of the Invention

In one aspect this invention relates to leading trailing drum brakes. In a further aspect, this invention relates to self-adjusting mechanisms useful with leading trailing brakes.

2. Prior Art

Leading trailing brake structures with manual adjustment means are well known in the art and have been used in vehicle applications for many years. The art has gradually evolved a variety of self-adjusting mechanisms where, when the brake shoes are separated from the associated drum by a distance greater than a predetermined minimum, a pawl or other activation means will turn a ratchet wheel which lengthens the strut, thereby increasing the separation between the shoes and adjusting the distance the brake shoes must travel in order to engage the brake. Such self-adjustment mechanisms were an improvement in that the brake was constantly being adjusted and the car need not be removed from service in order to adjust the brakes to the proper spacing. However, such adjusters had certain problems. Normally the strut had at least one end which was a forked or bifurcated portion engaging the web in one of the brake shoes. If the brake shoe separation became excessive due to unusual braking forces of the application of the mechanical parking brake, simultaneously with service brake activation, it was possible for this strut to become disengaged from the brake shoe resulting in the loss of rear braking. Also, the prior art brakes normally had called for adjustment mechanisms which comprised several parts in which they were rotatably mounted to the brake's web by means of various pins and shafts. Such structures were difficult to assemble and resulted in increased assembly problems and cost.

SUMMARY OF THE INVENTION

The brake of this invention is a leading trailing drum brake having a pair of brake shoes which are pivotably connected to a torque absorbing means at one pair of adjacent ends and in contact with a primary hydraulic activation means at the other pair of adjacent ends. The hydraulic actuator moves the brake shoes to a brake engaging position against the action of a brake return spring. An adjustable strut extends between the brake shoes to adjust the relative position between the shoes and the drum. The strut comprises a pair of relatively movable members with a toothed wheel thereon for lengthening the strut. A mechanical activation lever has one end pivotably mounted to the first brake shoe and engages the first end of the strut. An adjusting lever is pivotably mounted on the second brake shoe said adjusting lever having arms, one of said arms engaging the end of the adjustable strut at a point offset from the longitudinal axis of said strut to provide a force parallel to and spaced from the longitudinal axis of the strut. A second arm of said lever extends transversely through a shaped aperture in the web of said second brake shoe; and yet a third arm is attached to said second arm at a point distal from said first arm, said third arm extending substantially parallel to the web of the second brake shoe for attachment to a biasing means. The pawl arm extends from the said adjusting lever along said strut and engages the toothed wheel thereon.

DETAILED DESCRIPTION

Figure 1:
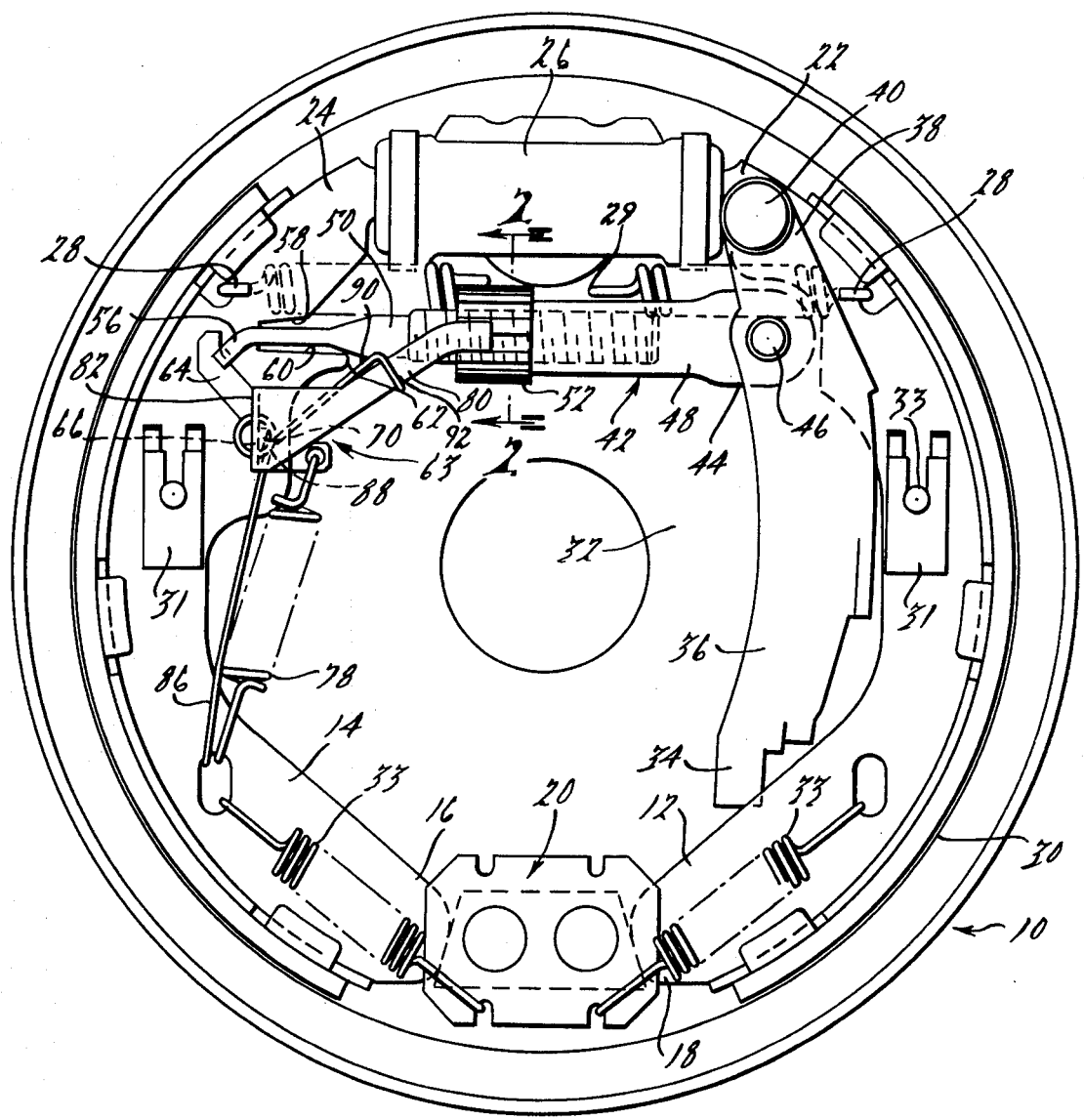
FIG. 1 is the side view of one embodiment of this invention.

The brake comprises a pair of opposed brake shoes 12, 14 having one pair of adjacent ends 16, 18 engaging a torque absorbing abutment 20 and the other pair of adjacent ends 22, 24 engaging a hydraulic brake actuator 26 for service brake operation. Also shown are springs 33 attached to the end of the brake shoes near the torque means 20 having one end in the engagement with a web portion of the associated brake shoe and the other in engagement with the torque absorbing means. The function of these springs 33 is to hold the brake shoes in engagement with the torque absorbing means as is well known in the art. A pair of shoe return springs 28 extends between adjacent ends 22, 24 of the shoes to a pair of apertures 29 located near the hydraulic actuator 26 and biases the shoes 12, 14 toward each other and out of engagement with a drum 30 braking surface. The brake shoes are held in a plane by a pair of clips 31 which connect over the end of a pin 33 which in turn is anchored to the backing plate 32.

The brake has a mechanical or parking brake which is activated mechanically. A hand brake cable (not shown) would be connected to a free end 34 of a brake operating arm 36 the other end 38 of the operating arm being pivotally mounted to the first brake shoe 12 by a pivot pin 40. The operating arm 36 as shown is fastened to an adjustable strut 42 at one end 44 by means of a rivet 46. The strut 42 comprises a first tubular rod 48 having a hollow interior and a second externally threaded rod 50 which is received in the tubular part. A toothed nut 52 having a plurality of circumferentially disposed rounded ratchet teeth 54, is threaded on the second threaded rod 50 to maintain the strut at the desired length. Rotation of the nut 52 will vary the length of the strut 42 thereby varying the spacing between the brake shoes 12, 14 and also the spacing between the shoes and the drum 30. As shown, the threaded portion of the strut engages the trailing shoe and the brake lever is on the leading shoe. The threaded rod 50 of the adjustable strut as shown has a bifurcated end 56 opposite the parking brake lever 36, engaging a complementary slot 58 on the web of the second brake shoe 14. A part of the bifurcated portion of the rod 50 is disposed at an oblique angle to the longitudinal axis of the strut 42 so that as the brake shoes separate during applications, the bifurcated portion 56 of the strut will slide along an extended web surface 60 on a pintle 62 juting out from the brake web. The bifurcated portion is angled so that it always clasps the pintle even if the free end has moved to a point where it is closer to the center of the brake than the closed end of slot 58. Normally, when a bifurcated structure reaches this position, the end can move transversely to the plane represented in the drawing which could disengage the strut.

The toothed nut 52 is rotated by an activating lever 63 pivotably mounted on the second shoe 14. The activating lever 63 has a first arm 64 which makes a point contact with the angled end 56 of the strut 42. The force coupled between the arm 64 and the angled end 56 will be offset from and substantially parallel to the strut. The first arm 64 is connected to a second arm 66 which is disposed orthogonally to the plane of the drawing. A reduced section 68 of the second arm 66 seats in a trapezoidal shaped aperture 70 in the web of the brake shoe 14. Shoulders 72 overlap the web when the actuating lever 63 is biased to its operating position as shown in the drawing. The shoulders 72 keep the pawl from slipping in the aperture to a disengaged position. The mounting arm 66 is connected to a third attachment arm 74 which lies on the side of the web opposite the first arm. The third attachment arm 74 has an aperture 76 engaged by a coiled spring 78 which has its opposite end attached to the brake shoe web, the spring providing a constant biasing force tending to pull the first arm into engagement with the bifurcated portion 56 of strut 42.

A pawl arm 80 projects from the juncture 82 between the first and second arms extending outward towards the toothed ratchet wheel 52. The pawl arm 80 constantly engages the circumferentially spaced ratchet teeth.

Figure 2:
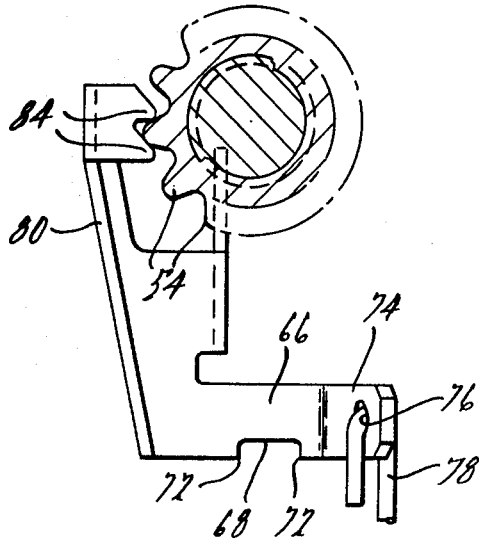
FIG. 2 is an enlarged section of an adjuster of FIG. 1.

As shown better in FIG. 2, the pawl arm 80 has two or more teeth 84 depending perpendicularly from the pawl which engaged the ratchet teeth. The use of a plurality of teeth on the pawl allows for finer braking adjustment when the pawl lever moves, since the pawl moves less in order to engage the next tooth. Operationally, the multi-toothed pawl makes for a more positive engagement between the pawl and adjustment nut.

In a preferred embodiment of this invention a pawl hold down spring 86 is associated with the pawl arm 80. The spring 86 is attached to an aperture in brake shoe 14 and has an intermediate coil portion 88 wrapped about the mounting arm 66 and a finger portion 90 which runs substantially parallel to the pawl arm 80 and has a hook 92 which is forced into contact with the pawl arm to bias the teeth 84 firmly against the ratchet wheel.

OPERATION

The brake of this invention adjusts whenever the separation of the ends 22, 24 of shoes 12, 14 is greater than a predetermined amount. If the separation between the shoes during the application is sufficiently large, the strut 42 pushing against the arm 64 will cause a rotation of the arm 66 which will in turn cause the pawl arm 80 to move enough to index the toothed wheel forward thereby lengthening the strut and reducing the gap between the shoes and drum.

Various modifications and alterations of this invention will become apparent to those skilled in the art without departing from the scope and spirit of this invention and it is to be understood that this invention is not limited to the illustrative embodiments set forth.

We claim:
1. A one-piece adjusting lever and mounting member for an internal shoe drum brake system which includes a pair of webbed brake shoes mounted in a conventional manner with a first pair of end portions supported for pivotal movement, one of the brake shoes having an aperture through the web, an axially extendable and contractable strut assembly between a pair of shoe second end portions with a rotatable member as part of the strut assembly so as to produce extension and contraction thereof, the one-piece adjusting lever and mounting member comprising: a sheet metal member having a first arm portion extending so that a free end thereof engages an end of the strut assembly to produce pivotal movements of the adjusting lever in response to relative movement between the strut assembly and the brake shoes; a second arm of the adjusting lever extending substantially normal to the first arm and through the aperture in the brake shoe web to provide a mounting fulcrum to pivot the adjusting lever in response to the actuating force on the first arm by the strut assembly, a third arm extending from the second arm in substantial parallelism with the web of the one brake shoe and on an opposite side thereof than the first arm; the adjusting lever further including a pawl arm for engaging the rotatable portion of the strut assembly at its free end so that pivotal movements of the adjusting lever about the point of engagement between the brake web and second arm produce circumferentially oriented movements of the pawl arm's free end relative to the struts rotatable member; means between the free end of the pawl arm and the rotatable member promoting mutual movement therebetween in one direction thus effecting rotation and resultant extension of the strut assembly and restraining mutual movement and rotation of the strut member so as to effect contraction thereof; biasing means on the adjusting lever including a first yieldable member between the third arm and the brake shoe for exerting a force between the movement promoting means as permitted by the interaction between the first arm and the strut assembly, a second yieldable member between the brake shoe and the pawl arm exerting a lateral force on and relative to the pawl arm to maintain engagement with the strut's rotatable member.

2. The adjusting assembly of claim 1 in which the engagement of the first arm and strut end is at an opposite side of the shoe web than the extension of the third arm whereby the force of the first yieldable member upon the adjusting body tends to twist the body so that the free end of the pawl arm bears against the rotatable member.

* * * * *